United States Patent [19]
Hwang

[11] Patent Number: 5,795,072
[45] Date of Patent: Aug. 18, 1998

[54] BEARING STRUCTURE FOR HARD DISK DRIVE

[75] Inventor: Tae-yeon Hwang, Sungnam, Rep. of Korea

[73] Assignee: Samsung Electro-mechanics Co., Ltd., Kyungki-do, Rep. of Korea

[21] Appl. No.: 739,456

[22] Filed: Oct. 29, 1996

[30] Foreign Application Priority Data

Jul. 25, 1996 [KR] Rep. of Korea .................. 1996 30436

[51] Int. Cl.⁶ .................................................. F16C 32/06
[52] U.S. Cl. ........................... 384/100; 384/107; 384/112
[58] Field of Search .................................. 384/100, 107, 384/112, 114, 121, 123, 109

[56] References Cited

U.S. PATENT DOCUMENTS

| | | | |
|---|---|---|---|
| 5,142,173 | 8/1992 | Konno et al. | 384/107 X |
| 5,280,208 | 1/1994 | Komura et al. | 384/107 X |
| 5,357,162 | 10/1994 | Aiyoshizawa et al. | 384/112 X |
| 5,358,339 | 10/1994 | Konno et al. | 384/107 |
| 5,538,347 | 7/1996 | Itoh et al. | 384/107 |

OTHER PUBLICATIONS

Hwang et al., "A Study of Static and Dynamic Characteristics on Self-Acting Waved-Journal Air Bearing", International Tribology Conference, Yokohama 1995, Synopses.

Florin Dimofte, "A Waved Journal Bearing Concept-Evaluating Steady-State and Dynamic Performance with a Potential Active Control Alternative", DE-vol. 60, Vibration of Rotating Systems ASME 1993 pp. 121-128.

*Primary Examiner*—Thomas R. Hannon
*Attorney, Agent, or Firm*—Leydig, Voit & Mayer, Ltd.

[57] ABSTRACT

A bearing structure for a hard disk drive includes a thrust bearing for forming a thrust air bearing for supporting a hub in an axial direction and a journal bearing for forming a journal air bearing for supporting the hub in a radial direction, being installed on the circumference of the shaft. According to the bearing structure, since each air bearing formed by the thrust and journal bearings noncontactly supports the hub in the axial and radial directions, the vibration occurring in a conventional ball bearing structure can be prevented. Therefore, a hard disk drive having high performance and low vibration characteristics can be manufactured.

10 Claims, 4 Drawing Sheets n: THE NUMBER OF WAVE a: THE AMPLITUDE OF WAVE
rj: INTERNAL RADIUS OF JOURNAL BEARING n: THE NUMBER OF WAVE a: THE AMPLITUDE OF WAVE
rj: INTERNAL RADIUS OF JOURNAL BEARING

BEARING STRUCTURE FOR HARD DISK DRIVE

BACKGROUND OF THE INVENTION

The present invention relates to a hard disk drive, and more particularly, to a bearing structure for a hard disk drive which supports rotation of a hub to which a magnetic disk is fixed, without contacting the hub, thereby reducing vibration of a hard disk drive and improving performance thereof.

A hard disk drive, one of auxiliary memory devices for a computer system, is for reproducing information from or recording information on a magnetic disk using a magnetic head.

Such a hard disk drive has been developed to satisfy the needs for a hard disk drive having the characteristics of high-speed, high-capacity, and low-vibration. A bearing structure for supporting a rotating body has been actively developed particularly for the hard disk drive having the high speed and low vibration characteristics.

FIG. 1 is a plan view of the configuration of a conventional hard disk drive.

Referring to FIG. 1, the conventional hard disk drive is comprised of a base housing 11 forming a frame, a magnetic disk 12 for storing information, a head stack assembly 13 for recording information on the magnetic disk 12 or reading information recorded on the disk 12, and a voice coil motor 14 for driving the head stack assembly 13 to move in a radial direction of the magnetic disk 12.

Here, the magnetic disk 12 is fixed to a hub 16 by a clamp 15. The head stack assembly 13 is installed to rotate around a pivot 13p. Also, the head stack assembly 13 includes an actuator 13a, a load beam 13b of an elastic board type connected to the actuator 13a, and a magnetic head 13h fixed to the end of the load beam 13b, for reading out and recording information from and on the magnetic disk 12.

An iron piece 17 made of a ferromagnetic substance is installed on an end portion of the actuator 13a opposing the magnetic head 13h. A latch 18 for holding the head stack assembly 13 by attracting the iron piece 17 when the hard disk drive is at pause, is installed on the track of the movement of the iron piece 17. Here, the latch 18 includes a permanent magnet 18m and a fixing member 18s for fixing the permanent magnet 18m.

FIG. 2 is a sectional view of the hard disk drive taken along line II—II of FIG. 1. Referring to FIG. 2, a ball bearing 22 is fitted between a shaft 21 fixed to the base housing 11 and a hub 16. A plurality of magnetic disks 12 are stacked on the outer circumference of the hub 16, each having a predetermined distance. Also, a rotor 23 is provided at an edge of the lower portion of the hub 16. A stator 24 is provided on the base housing 11 to thus constitute a motor with the rotor 23. Reference numeral 25 denotes a spacer member for maintaining the distance between the magnetic disks 12.

In the conventional hard disk drive having such a configuration, since the rotating body (the hub and the magnetic disk assembly) rotates in contact with the shaft via the ball bearing 22, vibrations and noises are generated. Such vibrations make it difficult for the magnetic head to accurately read and record information from and on the magnetic disk. This leads to difficulty in manufacturing of the hard disk drive.

SUMMARY OF THE INVENTION

To solve the above problem, it is an object of the present invention to provide a bearing structure for a hard disk drive which can support a shaft in a non-contact manner.

To accomplish the above object, there is provided a bearing structure for a hard disk drive including a thrust bearing for forming a thrust air bearing for supporting a hub in an axial direction and at least one journal bearing for forming a journal air bearing for supporting the hub in a radial direction, being installed on the circumference of the shaft.

According to the bearing structure of present invention having such a configuration, air bearings formed by the thrust and journal bearings support the hub as a rotating body in an axial direction and a radial direction without contact, thereby preventing the vibration caused by the conventional ball bearing structure.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
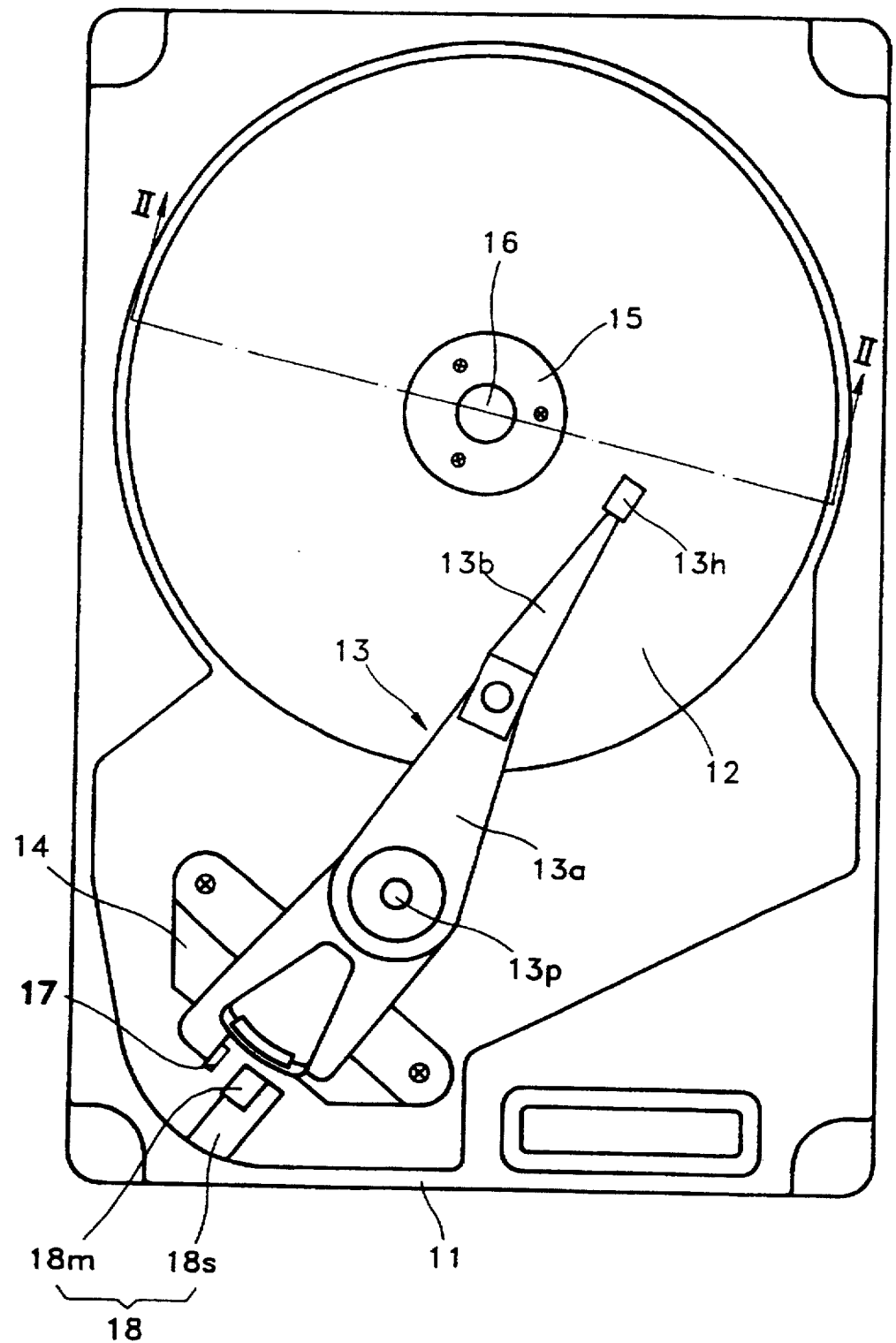
FIG. 1 is a plan view of the structure of a conventional hard disk drive.
Figure 2:
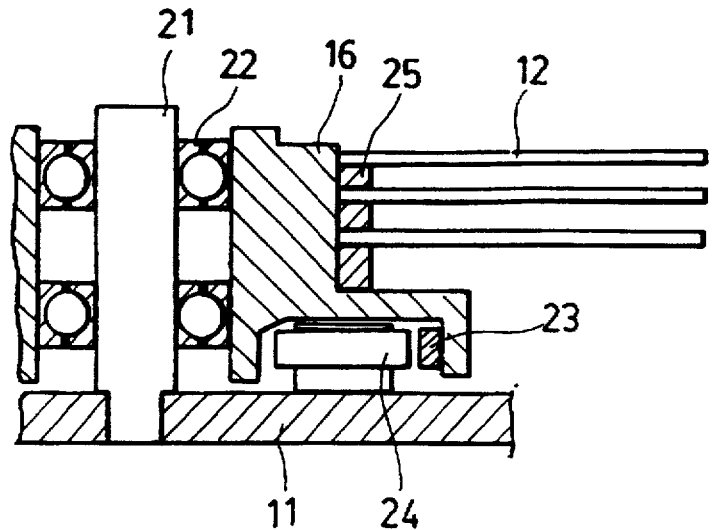
FIG. 2 is a sectional view taken along line II—II of FIG. 1.
Figure 3:
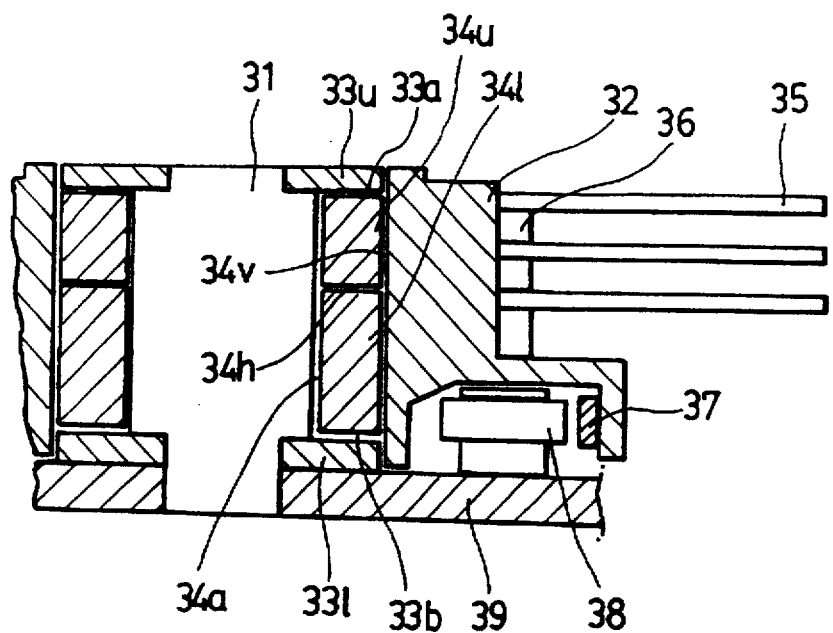
FIG. 3 is a sectional view of a hub assembly of a hard disk drive adopting a bearing structure according to the present invention.

Referring to FIG. 3, a bearing structure for a hard disk drive according to the present invention includes upper and lower thrust bearings 33u and 33l, for forming thrust air bearings 33a and 33b for supporting a hub 32 as a rotating body in an axial direction, installed at the upper and lower end portions of a shaft 31, respectively, and upper and lower journal bearings 34u and 34l, for forming a journal air bearing 34a for supporting the hub 32 in a radial direction, installed on the circumference of the shaft 31 between the upper and lower thrust bearings 33u and 33l. Reference numerals 35, 36, 37, 38 and 39 denote a magnetic disk, a spacer, a rotator, a stator, and a base housing, which are the same as those of the conventional bearing structure.

Figure 4:
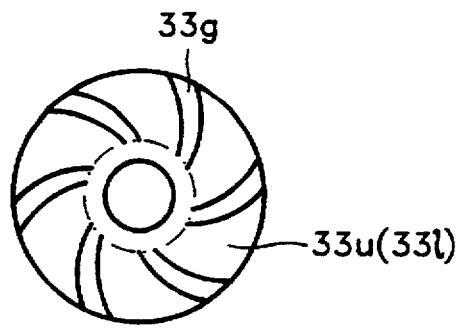
FIG. 4 is a plan view of a groove formed in a thrust bearing in the bearing structure according to the present invention.

As shown in FIG. 4, grooves 33g are formed on the lower surface of the upper thrust bearing 33u and the upper surface of the lower thrust bearing 33l so that air from the outside can be absorbed inward of the bearing structure as the hub rotates in an arrow direction. At this time, the grooves 33g of the upper thrust bearing 33u are formed to be curved in an opposite direction to those of the lower thrust bearing 33l. Accordingly, when the hub 32 rotates, the upper and lower thrust bearings 33u and 33l absorb the external air inward whereby the thrust air bearings 33a and 33b are formed on the lower part of the upper thrust bearing 33u and the upper part of the lower thrust bearing 33l.

Figure 5A:
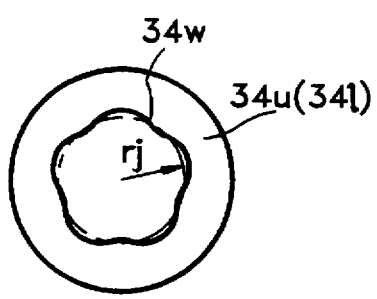
FIGS. 5A and 5B illustrate a wave formed in the inner circumferential surface of a journal bearing in the bearing structure according to the present invention.
Figure 5B:
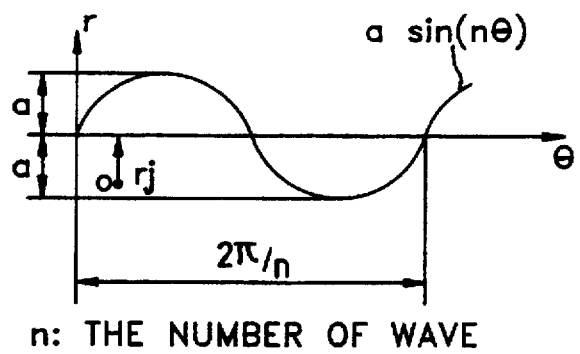

Meanwhile, as shown in FIG. 5, a wave 34w having a 2π/n-cycle is formed on the inner circumferential surfaces of the upper and lower journal bearings 34u and 34l, respectively. The wave 34w generates the journal air bearing 34a between the shaft 31 and the upper and lower journal bearings 34u and 34l during the rotation of the hub 32. Here, the pressure generated in the journal air bearing 34a varies in accordance with the number "n" and the amplitude "a" of the wave 34w. Thus, by adjusting the number "n" and the amplitude "a" of the wave 34w, the bearing can be manufactured suitable for its application.

Figure 6:
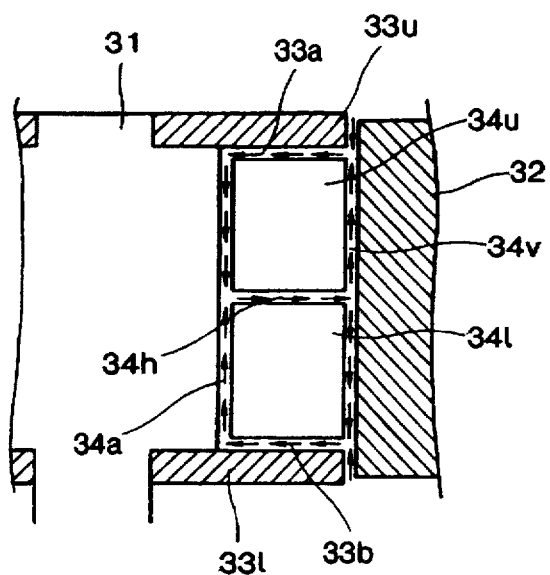
FIG. 6 shows the flow of air of an air bearing formed during the rotation of a hub in the bearing structure according to the present invention.

As shown in FIG. 6, air passages 34h and 34v for the flow of air are formed between the upper and lower journal bearings 34u and 34l and between the upper and lower journal bearings 34u and 34l and the hub 32, respectively.

An action of the bearing structure for a hard disk drive according to the present invention having such a configuration will now be described.

In FIG. 3, when a rotating body having the hub 32 is rotated by the driving force of a spindle motor constituted by the rotor 37 and the stator 38, a pumping action is made by the grooves 33g, respectively, formed on the upper and lower thrust bearings 33u and 33l. Thus, the thrust air bearings 33a and 33b are formed between the lower surface of the upper thrust bearing 33u and the upper surface of the upper journal bearing 34u, and the upper surface of the lower thrust bearing 33l and the lower surface of the lower journal bearing 34l, respectively, thereby generating air pressure. Thus, the above pressure makes it possible to support the rotating hub 32 in an axial direction without contact.

Figure 7:
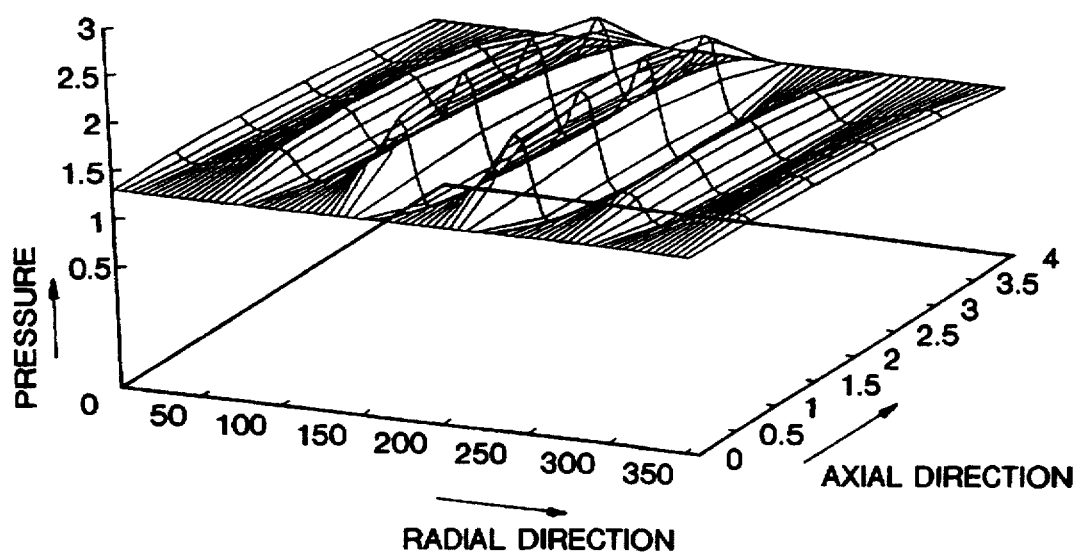
FIG. 7 is a graph indicating the distribution of pressure between a shaft and the journal bearing, during the rotation of the hub, in the bearing structure according to the present invention.

Meanwhile, when the hub 32 rotates, the journal air bearing 34a is formed between the shaft 31 and the upper and lower journal bearings 34u and 34l due to the wave 34w formed on the inner circumferential surfaces of the upper and lower journal bearings 34u and 34l. Thus, as shown in FIG. 7, the pressure distribution is generated between the outer circumferential surface of the shaft 31 and the inner circumferential surfaces of the upper and lower journal bearings 34u and 34l. The pressure distribution makes it possible to support the hub 32 in a radial direction without contact.

As described above, in the bearing structure for hard disk drive according to the present invention, the respective air bearings formed by the thrust bearings and the journal bearings support the hub, a rotating body, in the axial and radial directions in a noncontacting manner. Therefore, the vibration occurring in the conventional ball bearing structure can be prevented, thereby enabling the manufacturing of the hard disk drive having high performance and low vibration characteristics.

What is claimed is:

1. A bearing structure for a hard disk drive comprising:
    a first thrust bearing for forming a first thrust air bearing for supporting a hub in an axial direction; and
    first and second journal bearings disposed around a shaft for forming a journal air bearing for supporting the hub with respect to the shaft in a radial direction, air passages being formed between the first and second journal bearings and between the journal bearings and the hub.

2. A bearing structure for a hard disk drive as claimed in claim 1, further comprising a second thrust bearing for forming a second thrust air bearing, the first and second thrust bearings being installed on opposite sides of the journal bearings.

3. A bearing structure for a hard disk drive as claimed in claim 2, further comprising grooves disposed on opposing surfaces of the first and second thrust bearings so that air from outside can be drawn inward during rotation of the hub.

4. A bearing structure for a hard disk drive as claimed in claim 3, wherein the grooves of the first thrust bearing are curved in an opposite direction to the grooves of the second thrust bearing.

5. A bearing structure for a hard disk drive as claimed in claim 1, wherein a wave having a predetermined cycle and amplitude is formed on an inner circumferential surface of the journal bearings.

6. A bearing structure for a hard disk drive as claimed in claim 1, wherein grooves are formed on an inner surface of the first thrust bearing so that air from outside can be drawn inward during rotation of the hub.

7. A bearing structure for a hard disk drive as claimed in claim 1 wherein the journal bearings are secured to the hub for rotation with the hub about the shaft.

8. A bearing structure for a hard disk drive comprising:
    a thrust bearing for forming a thrust air bearing for supporting a hub in an axial direction;
    a shaft; and
    first and second journal bearings disposed around the shaft for forming a journal air bearing for rotatably supporting the hub with respect to the shaft, an air passage being formed between the first and second journal bearings from an outer circumference to an inner circumference of the journal bearings.

9. A bearing structure for a hard disk drive as claimed in claim 8 wherein the journal bearings are rotatable with the hub about the shaft.

10. A bearing structure for a hard disk drive comprising:
    a thrust bearing for forming a thrust air bearing for supporting a hub in an axial direction;
    a shaft; and
    a journal bearing disposed around the shaft for forming a journal air bearing for rotatably supporting the hub with respect to the shaft, the journal bearing being rotatable with the hub about the shaft, an air passage extending in an axial direction of the shaft being formed between an outer circumference of the journal bearing and an inner circumference of the hub.

* * * * *